No. 699,165. Patented May 6, 1902.
J. M. GRANT.
COTTON CHOPPER.
(Application filed Feb. 23, 1901.)
(No Model.) 2 Sheets—Sheet 1.

WITNESSES:
INVENTOR,
James M. Grant,
BY
Attorneys

No. 699,165. Patented May 6, 1902.
J. M. GRANT.
COTTON CHOPPER.
(Application filed Feb. 23, 1901.)
(No Model.) 2 Sheets—Sheet 2.

WITNESSES:
L. C. Hills
Clarence Shaw

INVENTOR
James M. Grant,
BY
Attorneys

UNITED STATES PATENT OFFICE.

JAMES M. GRANT, OF BAB, ARKANSAS.

COTTON-CHOPPER.

SPECIFICATION forming part of Letters Patent No. 699,165, dated May 6, 1902.

Application filed February 23, 1901. Serial No. 48,435. (No model.)

*To all whom it may concern:*

Be it known that I, JAMES M. GRANT, a citizen of the United States, residing at Bab, in the county of Calhoun and State of Arkansas, have invented a new and useful Cotton-Chopper, of which the following is a specification.

This invention relates to improvements in cotton-cultivators; and the object is to provide a simple and improved machine for use in the cultivation of cotton comprising means for chopping the plants, scraping the soil, and pulverizing and loosening the soil at each side of the rows of cotton.

With the above object in view the invention consists in the novel features of construction hereinafter fully described, particularly pointed out in the claims, and clearly illustrated by the accompanying drawings, in which—

Figure 1:
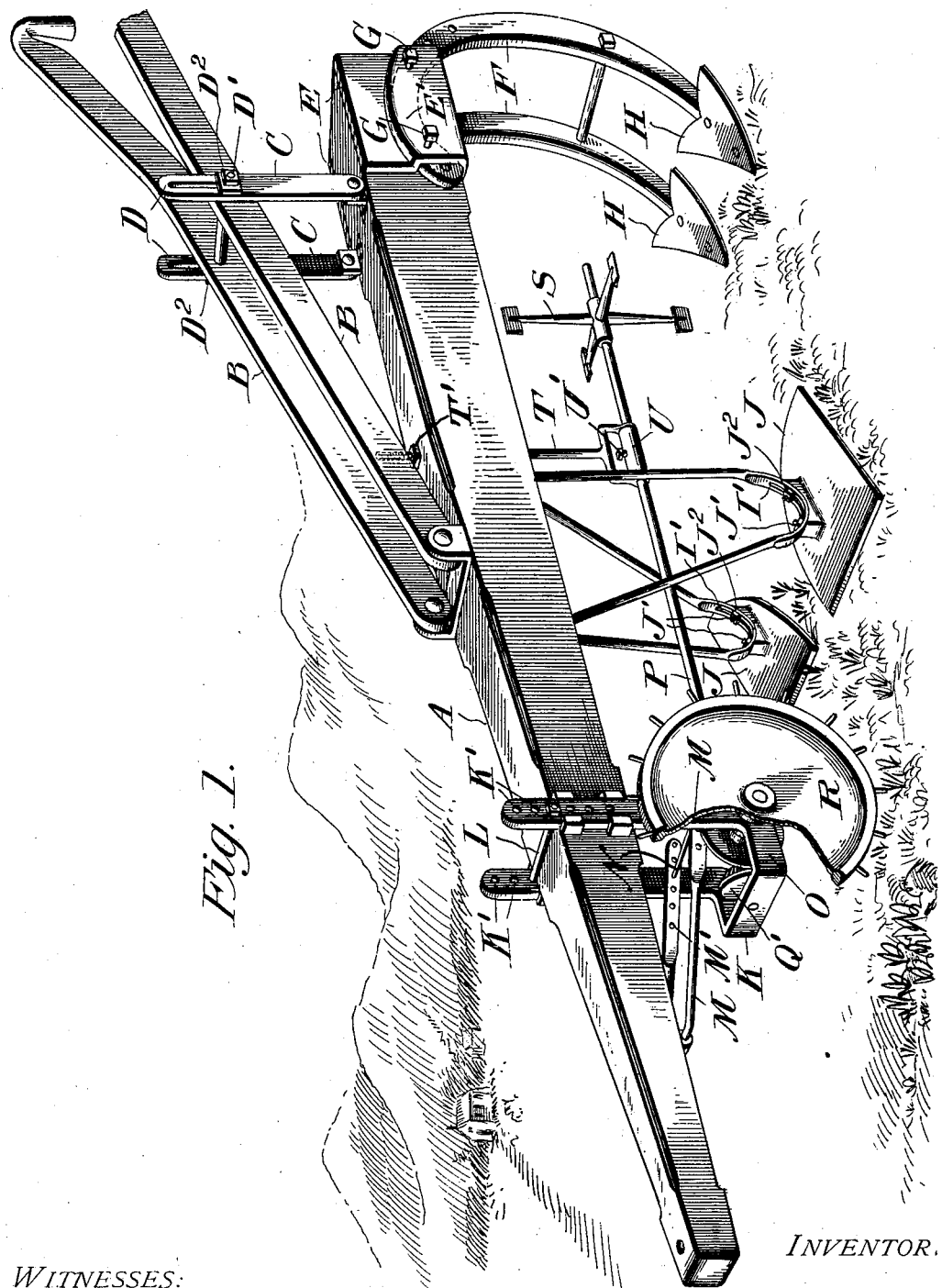
Figure 2:
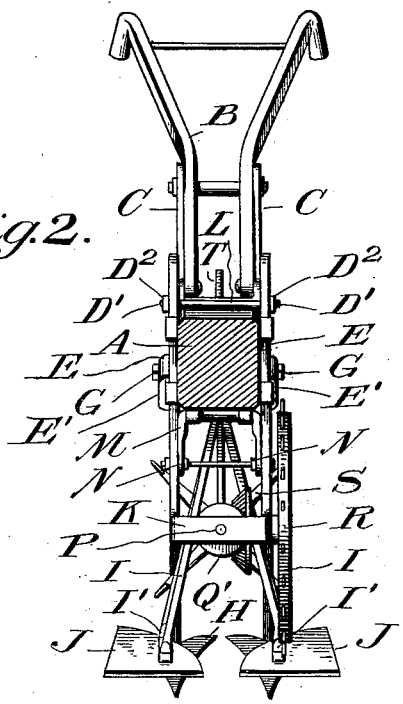
Figure 4:
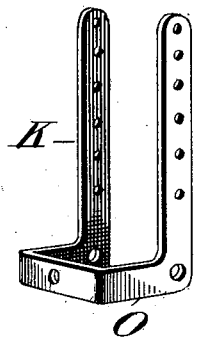
Figure 3:
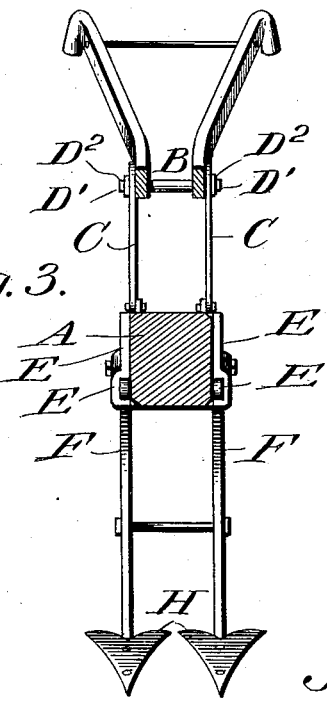
Figure 5:
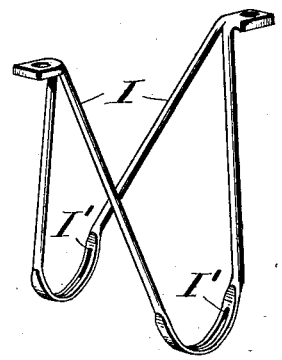

Figure 1 is a perspective view; Fig. 2, a vertical section through the beam forward of the driving mechanism for the chopper and looking in the direction of said mechanism; Fig. 3, a similar view through said beam in advance of the plow point or shares and looking in the direction of the latter, and Fig. 4 a detail view showing the adjustable connection between the scraper-blade and its support.

Referring now more particularly to the drawings, A designates the beam, to which the handles B are secured at their lower ends, said handles extending rearwardly and supported adjacent to their rear ends by the braces C. The connection of the handles to the beam is in the nature of a pivotal connection, and said braces are slotted at their upper ends, as at D, to receive threaded bolts D', carrying clamping-nuts $D^2$. Through the medium of this construction the handles may be adjusted vertically and secured in their adjustment by said clamping-nuts.

Secured to each side of the beam, at the rear end thereof, is the plate E, offset centrally to form curved grooves E', in which the curved standards F are adjustable, said standards at their upper ends being flattened and perforated to receive the set-screws G, carried by the plates, which set-screws hold the standards in the desired adjustment. The standards at their lower ends carry the plow points or shares H, which loosen and pulverize the soil at each side of the row of cotton.

Secured to the under side of the beam, forward of the plow-points, are the scraper-plate-supporting standards, said standards being in the shape of a doubled piece of metal, having the legs I thereof secured to the under side of the beam and contracted at their lower ends to form slots or ways I' and bent at an inclination, as illustrated.

J designates the blades, which are secured to the standards and adjusted thereon through the medium of bolts J', moving in the ways or the slots of the standards and receiving clamping-nuts $J^2$. As illustrated, these blades are set at any angle and diverging from each other at their rear ends.

The standard K depends from the beam forward of the scraper-blades, said standard being formed of a U-shaped strap having its legs spanning the beam and connected at their ends by a bolt L, which rests upon the top of the beam. The legs of the standard are provided with a series of perforations K' to receive said bolt, whereby said standard is capable of vertical adjustment. Pivoted at its forward end to the under side of the beam in front of the standard K is a bar M, formed with slots M'. These slots receive a bolt N, connecting the legs of the standard below the beam. This bar serves to hold the standard after it has been adjusted longitudinally upon the beam. The lower end of the standard is bent at right angles, as indicated by the letter O, and supports one end of a driving-shaft P, carrying on its end a pinion Q', meshing with a gear formed on a ground-wheel R, also supported by said standard. Shaft P carries on its rear end the choppers S, which revolve between the scraper-blades and the plow-points. The shaft is supported near its rear end by a standard T, which is screw-threaded and passes through the beam, receiving a nut T' on each side of the beam for holding it in its adjusted position. Said standard at its lower end is bifurcated, with the bifurcations provided with perforations through which the driving-shaft extends and freely rotates. The shaft is prevented from longitudinal movement by a sleeve U, secured thereon by the set-screw U' and positioned between the bifurcations of the standard.

It will be seen from the above description that the shaft carrying the choppers may be adjusted both vertically and longitudinally and that the scraper-blades, the plows, and the handles are also capable of vertical adjustment.

Having thus fully described my invention, what I claim as new, and desire to secure by Letters Patent of the United States, is—

1. In a cotton-cultivator, the combination with a supporting-beam, of a standard movable longitudinally on said beam, a bar carried by said beam and locking said standard from longitudinal movement, a shaft carried by said standard, a support for the opposite end of said shaft, and a chopper carried by said shaft, substantially as described.

2. In a cotton-cultivator, the combination with a beam, of a bifurcated standard having the legs thereof extending on the respective sides of the beam and connected above said beam, a bar pivoted to the beam and formed with slots engaging a projection carried by the standard, a shaft supported at one end in said standard, a bifurcated standard depending from the beam and receiving the opposite end of said shaft, a sleeve on said shaft between the bifurcations of the standard, and a chopper carried by said shaft, substantially as described.

JAS. M. GRANT.

Witnesses:
W. C. HORTON,
J. M. MITCHELL.